(12) United States Patent
Berggren et al.

(10) Patent No.: US 8,780,847 B2
(45) Date of Patent: Jul. 15, 2014

(54) UPLINK CONTROL INFORMATION TRANSMISSION

(71) Applicant: Huawei Technologies Co., Ltd., Shenzhen (CN)

(72) Inventors: Fredrik Berggren, Vasby (SE); Mattias Frenne, Uppsala (SE); Branislav Popovic, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/629,277

(22) Filed: Sep. 27, 2012

(65) Prior Publication Data

US 2013/0022007 A1 Jan. 24, 2013

Related U.S. Application Data

(63) Continuation of application No. PCT/CN2010/073812, filed on Jun. 11, 2010.

(51) Int. Cl.
*H04W 4/00* (2009.01)

(52) U.S. Cl.
USPC .......... 370/329; 370/343; 455/452.1

(58) Field of Classification Search
None
See application file for complete search history.

(56) References Cited

U.S. PATENT DOCUMENTS

| | | | |
|---|---|---|---|
| 2010/0098012 A1 | 4/2010 | Bala et al. | |
| 2010/0113079 A1* | 5/2010 | Varotto et al. | 455/509 |
| 2010/0118720 A1* | 5/2010 | Gauvreau et al. | 370/252 |
| 2010/0234037 A1* | 9/2010 | Terry et al. | 455/450 |
| 2010/0273515 A1* | 10/2010 | Fabien et al. | 455/509 |
| 2011/0088987 A1 | 4/2011 | Santy et al. | |
| 2011/0141928 A1* | 6/2011 | Shin et al. | 370/252 |
| 2011/0249639 A1* | 10/2011 | Jen | 370/329 |
| 2011/0268045 A1 | 11/2011 | Heo et al. | |

(Continued)

FOREIGN PATENT DOCUMENTS

| | | |
|---|---|---|
| CN | 101409894 A | 4/2009 |
| CN | 101695017 A | 4/2010 |

(Continued)

OTHER PUBLICATIONS

International Search report and Written Opinion of the International Searching Authority received in Patent Cooperation Treaty Application No. PCT/CN2010/073812, mailed Mar. 24, 2011, 10 pages.

(Continued)

*Primary Examiner* — Brian Roberts
(74) *Attorney, Agent, or Firm* — Slater & Matsil, L.L.P.

(57) ABSTRACT

Uplink control information transmission method, and a network node and a UE implementing the method are disclosed. According to an embodiment of the invention, uplink control information is transmitted from a UE to a network node by defining a set including at least one of the of uplink component carriers being usable for carrier aggregation for the UE. For this set, a priority indication is assigned to each one of the at least one uplink component carrier included in the set. Then, if this set includes at least one uplink component carrier comprising an uplink shared channel, one of these at least one uplink component carrier comprising an uplink shared channel is selected for transmission of uplink control information in that uplink shared channel. Selection based on at least one of the at least one assigned priority indication, when selecting uplink component carrier, is disclosed.

31 Claims, 1 Drawing Sheet

(56) References Cited

U.S. PATENT DOCUMENTS

2012/0057547 A1\* 3/2012 Lohr et al. .................. 370/329
2012/0093097 A1 4/2012 Che et al.
2012/0201212 A1 8/2012 Xia et al.

FOREIGN PATENT DOCUMENTS

| CN | 101702823 A | 5/2010 |
| JP | 2013508088 A | 3/2013 |
| JP | 2013526216 A | 6/2013 |
| WO | WO 2010/035117 A1 | 4/2010 |

OTHER PUBLICATIONS

3GPP TS 36.213 V.9.2.0 (Jun. 2010), 3$^{rd}$ Generation Partneship Project; Technical Specification Group Radio Access Network; Evolved Universal Terrestrial Radio Access (E-UTRA); Physical Layer procedures (Release 9); 80 pages.

3GPP TSG RAN WG1 #61; Montreal, Canada, May 10-14, 2010; R1-102692; "UCI Piggyback onto PUSCH for carrier aggregation," 4 pages.

3GPP TSG RAN WG1 Meeting #61; Montreal, Canada, May 10-14, 2010, R1-103067; "UCI Transmission in the Presence of UL-SCH Data," 2 pages.

ASUSTeK, "Power Control for Multiple Carriers," 3GPP TSG RAN WG1 Meeting #60, R1-100995, San Francisco, CA Feb. 22-26, 2010, 3 pages.

LG Electronics, "Power Scaling Rule for Power Limited LTE-A UE," 3GPP TSG WG1 #60bis, R1-10214, Beijing China, Apr. 12-16, 2010, 3 pages.

Extended European Search Report for Application No. 10852699.7, Applicant: Huawei Technology Co., Ltd., mailed May 27, 2013, 8 pages.

Notice of Reasons for Rejection received in Japanese Application No. 2013-513514 mailed Feb. 12, 2014, 6 pages.

Huawei, "CQI/PMI/RI reporting for carrier aggregation," 3GPP TSG RAN WG1 Meeting #61, R1-103090, Montreal, Canada, May 10-14, 2010, 7 pages.

\* cited by examiner

UPLINK CONTROL INFORMATION TRANSMISSION

This application is a continuation of International Application No. PCT/CN2010/073812, filed Jun. 11, 2010, which application is incorporated herein by reference.

TECHNICAL FIELD

The present invention relates generally to communication systems and, in particular embodiments, to uplink control information transmission.

BACKGROUND

Contemporary cellular systems, such as 3rd Generation Partnership Project (3GPP) Evolved UMTS Terrestrial Radio Access (E-UTRA) Long Term Evolution release 8 (LTE Rel-8) systems, rely on link adaptation to the existing radio environment in order to maximize the spectral efficiency. Such link adaption may relate, e.g., to Modulation and Coding Scheme (MCS), as well as different Multiple-Input and Multiple-Output (MIMO) transmission modes. The related measures from which adaptation is performed can generally be referred to as Channel State Information (CSI), and could typically include Channel Quality Indicator (CQI), transmission Rank Indicator (RI) and Precoder Matrix Index (PMI). To enable for the link adaptation, the User Equipment (UE) feeds back these measures in the uplink (UL) to the eNodeB. The Uplink Control Information (UCI) may also include acknowledgement/negative acknowledgement (ACK/NACK) in response to downlink (DL) transmissions. Thus, the UCI can include any one of, or any combination of an Ack, a Nack, a periodic CQI report, an aperiodic CQI report, a periodic RI report, a periodic PMI report, an aperiodic CQI report, an aperiodic RI report, an aperiodic PMI report, and a Scheduling Request (SR).

In LTE Rel-8, UCI is either transmitted on the Physical Uplink Control Channel (PUCCH) or on the Physical Uplink Shared Channel (PUSCH). Simultaneous transmission of PUCCH and PUSCH never occurs in the LTE Rel-8 system. Two kinds of CSI reporting methods are supported in the system; periodic CSI reporting and aperiodic CSI reporting. Periodic CSI reports are transmitted on the PUCCH and the related parameters, such as, e.g., periodicity, and transmission resources are configured by higher layers. Aperiodic CSI reports are transmitted in the PUSCH and are triggered by a CQI request bit in an UL grant in the Physical Downlink Control Channel (PDCCH) that schedules the PUSCH.

Aperiodic CSI can also be multiplexed with normal data in the PUSCH. In LTE Rel-8, in case UCI transmission in the PUCCH would occur simultaneously as a PUSCH transmission, the UCI in the PUCCH is transmitted in the PUSCH instead, and the PUCCH is not transmitted. If an aperiodic CQI report would be scheduled in the same subframe as a periodic CQI report, the periodic CQI report is not transmitted.

In LTE Rel-8, there is no carrier aggregation implemented and hence there exists no problem of determining an UL CC for transmitting UCI, and of course no solution for this has been presented.

Hence, in a radio communication system employing carrier aggregation, in case more than one PUSCH is to be transmitted in a subframe, there exists a problem in the system being related to how to determine the PUSCH on which UCI should be transmitted, such that enhanced system performance and operation are achieved.

SUMMARY OF THE INVENTION

Embodiments of the invention relate to a method for uplink control information transmission in a radio communication system utilizing carrier aggregation, wherein a number of uplink component carriers can be aggregated for communication between a User Equipment (UE) and a network node in the system.

Embodiments of the invention also relate to a network node arranged for receiving uplink control information transmission in a radio communication system utilizing carrier aggregation, wherein a number of uplink component carriers can be aggregated for communication between a UE and the network node in the system.

Embodiments of the invention also relate to a computer program and a computer program product.

For example, embodiments of the present invention provide an uplink control information transmission that solves problems stated in the background.

According to an aspect of the invention, an uplink control information transmission to be used for carrier aggregation systems is disclosed, wherein the uplink control information transmission results in better system performance and operation than the uplink control information transmission known in the prior art.

An embodiment method for uplink control information transmission comprises defining a set including at least one of the number of uplink component carriers. A priority indication is assigned to each of the at least one uplink component carrier of the set. If the set includes at least one uplink component carrier comprising an uplink shared channel, one of the at least one uplink component carrier comprising an uplink shared channel is selected for transmission of uplink control information in the uplink shared channel. The selection is based on at least one of the at least one assigned priority indication.

An embodiment network node comprises set definition means, which are arranged for defining a set including at least one of the number of uplink component carriers. Priority assignment means are arranged for assigning a priority indication to each of the at least one uplink component carrier of the set. Selection means are arranged for selecting, if the set includes at least one uplink component carrier comprising an uplink shared channel, one of the at least one uplink component carrier comprising an uplink shared channel for reception of uplink control information in the uplink shared channel. The selection is based on at least one of the at least one priority indication. Reception means are arranged for receiving at least the one selected uplink shared channel.

An embodiment UE comprises selection means, which are arranged for selecting from a set including at least one of the number of uplink component carriers. If the set includes at least one uplink component carrier comprising an uplink shared channel, one of the at least one uplink component carrier comprising an uplink shared channel for transmission of uplink control information in the uplink shared channel. The selection is based on at least one priority indication assigned to at least one uplink component carrier of the set. Transmission means are arranged for transmitting the uplink control information in the uplink shared channel of the selected one uplink component carrier.

An embodiment method for uplink control information transmission, network node, UE, computer program, and computer program product according to the present invention are characterized by selection of one uplink shared channel of an uplink component carrier based on one or more priority indications being assigned to one or more selectable uplink component carriers, respectively. Thus, the choice of uplink shared channel for carrying the UCI can be made intelligently, since it is based on these one or more assigned priority indications. Example priority indication in the form of a priority value, which represents a priority ranking, or in the form of a carrier index, which points out a specific carrier, e.g., having a highest priority is disclosed.

The uplink control information transmission according to the invention may also be adapted to the occurring system situation, regarding for example system load and interference, which results in a system being adaptively optimized over time. Thereby, the overall system performance is increased.

According to various embodiments of the invention, definition of the set of uplink component carriers, assignment of priority indications, and signalling of these priority indications are performed, respectively, in such a way that system performance is enhanced at the same time as system overhead is kept at a minimum.

Detailed exemplary embodiments and advantages of the method for UCI transmission, the network node, and the UE according to the invention will now be described with reference to the appended drawings illustrating some preferred embodiments.

BRIEF DESCRIPTION OF THE DRAWINGS

The lone FIGURE schematically shows example radio communication system and device according to the invention.

DETAILED DESCRIPTION OF ILLUSTRATIVE EMBODIMENTS

In this document, the invention is explained in terms of an LTE, or LTE-Advanced system, although the invention is not restricted to a specific system. As is understood by a skilled person, the invention may be implemented in essentially any system utilizing carrier aggregation.

In a system utilizing carrier aggregation, such as applied in LTE-Advanced (i.e. LTE Rel-10 and beyond), a UE may be able to receive/transmit on several component carriers (CCs). At most 5 downlink component carriers, and/or at most 5 uplink component carriers can be aggregated. For carrier aggregation, a UE will be configured by higher layers with a set of CCs to use. One of the CCs is referred to as the primary CC (PCC), which is UE-specific. Other CCs are referred to as secondary CCs (SCCs). It is in LTE-Advanced also considered to implement CC activation/deactivation of the configured CCs. On a deactivated DL CC, the UE would not monitor PDCCH, nor receive Physical Downlink Shared Channel (PDSCH), nor perform CQI measurements.

In the LTE standard, both the terms component carrier and cell exist. The term component carrier is related to a carrier frequency which is a term typically used when arranging measurements, and UEs then report cells on that carrier frequency. The term cell is used for many other instances, such as mobility, which refers to a change of serving cell. A cell may include both an uplink and a downlink direction of communication. For example, a UE can be assumed to have a Primary Serving Cell (PCell). In the DL, the carrier corresponding to the PCell is the DL PCC while in the UL it is the UL PCC. Similarly, Secondary Serving Cell (SCell) may be configured together with the PCell. In the DL, the carrier corresponding to the SCell is the DL SCC while in the UL it is the UL SCC. Hence, carrier aggregation can equivalently be expressed as the aggregation of serving cells. In this document, we assume the notion of carrier aggregation by means of component carriers, but a person skilled in the art could equivalently use the terminology of cells instead of component carriers in relation to carrier aggregation and transmission.

Carrier aggregation implementation introduces a problem related to CSI reporting, since it needs to be determined on which UL CC(s) the UCI should be transmitted.

For systems employing carrier aggregation, e.g., in LTE-Advanced, it is, in order to simplify the reporting procedure, assumed that the UL PCC carries PUCCH ACK/NACK and periodic CSI. Also, similar to Rel-8, it is assumed that UCI information in the PUCCH can be transmitted in a PUSCH, possibly multiplexed with user data. Furthermore, it is assumed that in LTE-Advanced UCI cannot be carried on more than one PUSCH in a given subframe.

In prior art, it has, for LTE-Advanced, been suggested that UCI is transmitted on a single scheduled PUSCH. This single PUSCH can be a PUSCH scheduled on the UL PCC. In case when the UL PCC is not scheduled, any scheduled UL CC can be selected to transmit UCI. However, it was not given how the selection should be done. Thus, according to this prior art solution, the selection can be done arbitrarily, which of course cannot guarantee any system performance advantages for this selection procedure. An arbitrary selection implies that the eNodeB has no á priori information on the selected UL CC and therefore has to blindly detect all received PUSCHs for UCI. This significantly increases the complexity in the receiver.

In prior art, it has, for LTE-Advanced, also been suggested that UCI from a PUCCH should be transmitted in the PUSCH of the same CC, if there is a PUSCH in that CC. Otherwise, the UCI of this CC should be transmitted in the PUCCH, regardless if there are other CCs which have PUSCHs. Thus, according to this prior art proposal, there is no selection among different downlink CCs having PUSCHs for transmitting UCI, also if there are other PUSCHs available. Hence, this proposal offers a solution to a specific situation, but does not offer a general solution to the problem of determination of on which UL CC(s) the UCI should be transmitted, which lowers the system performance, since many situations occurring in the system are not covered. Furthermore, this solution implies that there could be simultaneous transmission of PUCCH and PUSCH(s) in different CCs. Such operation may increase the power dynamics of the signal, and therefore requires larger transmit power backoff, which implies worse performance. Simultaneous PUCCH and PUSCH may also imply larger out-of-band spectral emissions, which need to be suppressed.

Generally, in a radio communication system, the Uplink Control information (UCI) can consist of two kinds of information, namely, information that is not associated with a scheduled uplink channel or information that is associated with a scheduled uplink channel.

In the context of carrier aggregation utilizing systems, such as an LTE-Advanced system, the kind of UCI being non-associated with a scheduled uplink channel includes ACK/NACK and/or periodic CSI reports, which are normally transmitted on the PUCCH. The kind of UCI being associated with a scheduled uplink channel includes aperiodic CSI reports, which are transmitted on the PUSCH. This invention aims at solving the above mentioned problems being related to selection of an UL CC having a PUSCH, such that this selected UL CC is to be used at least for transmitting UCI being non-associated with a scheduled uplink channel. The PUSCH may contain user data and/or aperiodic CSI reports in addition to the UCI being non-associated with a scheduled uplink channel.

The solution according to embodiments of the invention is very advantageous in comparison to any possible more straightforward solution to the above stated problems. Such a straightforward solution could, for example, be to have a fixed pre-defined rule in the standard saying that a unique UL CC should be chosen for each UCI transmission. Such a fixed predetermined rule could, e.g., be a rule saying that the PUSCH with the UL CC having the lowest carrier frequency is always used.

However, such fixed pre-defined rules would usually be too restrictive and would lead to poor system operation. For example, different CCs could have different bandwidths, which are not related to the carrier frequencies, and it may not be desirable to force UCI transmission to a narrow band carrier. Moreover, the load and long-term interference situation may also differ among carriers, and it may also be advantageous for distributing UCI transmissions for different UEs to different UL CCs. This is possible by this invention, as the priority indications can be UE-specific, i.e., one specific UL CC can be used for different UEs, and could then, according to the invention, have different priority indications for different UEs.

Thus, these drawbacks of possible more straightforward solutions are also solved by the present invention, since the selection procedure takes a number of system parameters into account when assigning priority indications that are later used when selection uplink shared channel for the UCI transmission.

By means of selection using priority indications, the uplink shared channel used for transmitting the UCI can be selected such that one or more of, e.g., system performance, system load, and short term and long term interference situations for the radio interface are taken into account, since the priority assignment depends on one or more of these system parameters. Thereby, transmission of UCI can be optimized from a system point of view.

Furthermore, by means of selection using these priority indications, the receiver, for example the network node, has a priori information on the selected UL CC. Thereby, the need for blind detection of UCI in the network nodes can be decreased.

According to one aspect of the invention, uplink control information is transmitted from a UE, such as a mobile station or any other entity in the radio system communicating with a network node over a radio interface, to a network node, such as a base station, a NodeB (NB), an eNodeB (eNB), or the like, by defining a set including at least one of the of uplink component carriers being usable for carrier aggregation for the UE. Hence, different UEs could have different sets. For this set, a priority indication is assigned to each one of the at least one uplink component carrier included in the set for this UE. Then, if this set includes at least one uplink component carrier comprising an uplink shared channel, one of these at least one uplink component carrier comprising an uplink shared channel is selected for transmission of uplink control information in that uplink shared channel. When selecting the uplink component carrier, the selection is based on at least one of the at least one assigned priority indication.

In other words, if the defined set includes at least one uplink component carrier comprising an uplink shared channel, one of the at least one uplink shared channel being included in the defined set is selected for transmission of uplink control information. One or more of the at least one priority indication being associated with the at least one uplink component carrier of the set, respectively, are taken into consideration when making the selection.

Thus, according to the invention, selection of an UL CC with an uplink shared channel (e.g., PUSCH) for UCI transmission is performed. This selection is performed by establishing a priority order (i.e., a ranking, or preference enumeration) of the defined set of UL CCs. Each UL CC in the set is assigned a priority indication/value. Based on at least one of these priority values, the UE selects the most preferred UL CC among the UL CCs that contain an uplink shared channel (e.g., PUSCH).

As will be described below, the one or more priority indications being assigned to the one or more UL CCs of the set, respectively, for example the priority order or a corresponding priority list, shall be known to both the UE and the network node.

According to an embodiment of the invention, the set of uplink component carriers being defined includes at least two uplink component carriers. The UCI will then be transmitted on one selected UL CC being included in this set of multiple uplink component carriers. More precisely, the UL CC having the highest priority ranking and having a scheduled uplink shared channel is selected for the transmission.

According to an embodiment of the invention, the selection of one uplink component carrier is based on all priorities having been assigned to the at least one uplink component carrier of the set.

As non-limiting example of an UL CC index priority ordering, [1 3 2] could indicate that UCI transmission is firstly preferred to be transmitted on CC1 (having a highest priority), secondly on CC3 (having a second highest priority) and thirdly on CC2 (having a third highest priority). A UE would then select the most preferred UL CC that also has a PUSCH. For example, if CC2 and CC3 each have a PUSCH and CC1 does not have a PUSCH, CC3 would then be selected.

According to an embodiment of the invention, the defined set includes all uplink component carriers configured for carrier aggregation for the UE.

According to another embodiment of the invention, the defined set includes all uplink component carriers activated for carrier aggregation for the UE.

According to another embodiment of the invention, the defined set includes all uplink component carriers on which an uplink shared channel can be transmitted to the UE.

According to another embodiment of the invention, the defined set includes all uplink component carriers on which an uplink shared channel is transmitted to the UE.

According to an embodiment of the invention, the defined set includes an uplink primary component carrier (UL PCC). When an UL PCC is included in the set, the network node is allowed to fully decide the priorities of all UL CCs. This implies that all UL CCs' priorities need to be signaled to the UE for some cases, which is described below.

In the embodiments where priorities are assigned to two or more UL CCs, respectively, these priorities may need to be signaled from the network node to the UE, such that the UE can base its selection of UL CCs on these priorities.

Therefore, according to an embodiment of the invention, the at least one priority indication being assigned to the at least one uplink component carrier of the defined set, respectively, is signaled to the UE from the network node, such that the UE is informed of the one or more assigned priorities. The UE can then utilize these priorities when selecting UL CC, and thus when selecting uplink shared channel, for transmission of the uplink control information.

This signaling can be performed in a number of ways, which will be described in the following. Each of these methods has different advantages related to reliability, overhead and adaptability to current system properties. Thus, depending of the system situation and implementation, one or more of these methods can be suitable for use.

According to an embodiment of the invention, the network node signals the at least one priority indication to the UE by utilizing Radio Resource Control (RRC) signaling.

According to an embodiment of the invention, this RRC signaling can include component carrier configuration signaling. The priorities can here be obtained from the information provided in the initial CC configuration process performed by RRC signaling. For example, if each configured CC is indexed in the higher layers, and this indexing is signaled to the UE, this carrier indexing could be chosen such that it also represents the index ordering preference for UCI transmission on PUSCH. The utilization of RRC signaling can for example be used for an embodiment described above, wherein the defined set includes all uplink component carriers configured for carrier aggregation for the UE.

When utilizing RRC signaling, the priorities are signaled explicitly by higher network layers. RRC signaling is rather slow but reliable, and it requires small overhead and is used when configuring the CCs to be used for carrier aggregation.

According to an embodiment of the invention, the network node utilizes Medium Access Control (MAC) signaling when signaling the at least one priority indication to the UE. This MAC signaling can include component carrier activation or deactivation signaling, and can for example be used for the embodiment described above, wherein the defined set includes all components being activated for carrier aggregation for the UE.

When utilizing MAC signaling, the priorities are signaled explicitly by higher network layers. MAC signaling is slightly faster than RRC signaling and is, as stated above, suitable for example for activation/deactivation of CCs. When the UE can obtain the priorities from the information provided in the MAC signaling used for activating CCs, this has the advantage that the network node has a high degree of freedom to adjust the priorities according to the present load in the system.

According to an embodiment of the invention, the network node signals the at least one priority indication to the UE by utilizing downlink control channel signalling. When utilizing downlink control channel signalling, according to this embodiment, the one or more priority indications are signalled by the physical layer.

According to an embodiment of the invention, this downlink control channel signalling comprises at least one uplink grant. Each one of the one or more uplink grant is then associated with an uplink shared channel in one uplink component carrier.

Thus, the priorities here are obtained from information signaled in the UL grants that scheduled the PUSCHs. This has the advantage that the network node has full freedom to dynamically select the UL CC priorities and base them on the instantaneous radio link quality, which is beneficial if the load and interference on the UL CC change rapidly. Signaling of the priorities could be facilitated by adding new information bits to the downlink control channel signaling formats that signal the UL grants.

According to an embodiment of the invention, the at least one priority indication comprises a priority indication/value for each uplink component carrier being associated with an uplink grant. Thus, the indication/value signaled in an UL grant is the priority indication/value for the associated uplink shared channel in one UL CC. Furthermore, according to an embodiment, the assignment of priority values is arranged such that priority indications are only assigned for the UL CCs having valid UL grants.

An advantage of these embodiments is that the UE can detect a missed UL grant. For example, suppose that a UE is configured with 5 UL CCs and receives UL grants in CC1, CC2 and CC3, respectively, wherein the UL grant for CC1 comprises the priority value 2, the UL grant for CC2 comprises the priority value 3 and the UL grant for CC3 comprises the priority value 1. The priority indications do not consider the CCs that are not scheduled, for example, CC4 and CC5. If the UL grant for CC3 is lost or missed, for example due to interference or the like, the UE has still received priority values 2 and 3. Hence, the UE can then deduce that one UL grant has been lost or missed, namely the UL grant comprising the priority value 1.

According to another embodiment of the invention, the at least one priority indication comprises a single specific carrier index corresponding to an uplink component carrier having a highest priority. Thus, the indication/value signaled in an UL grant is the same in all UL grants and is the carrier index corresponding to the highest prioritized UL CC. An advantage of this embodiment is that it provides coding gain, since the same value is signaled in all UL grants. This means that a UE can double check if the UL grant was received correctly as the indication/value should be the same in all UL grants. This can be regarded as a form of virtual CRC bits, which also has benefits in reducing the false alarm probability, for example, the probability that a non-existing UL grant is detected by the UE.

The combinations of the bits in the UL grant can be referred to as code points. In many cases, not all code points are used to carry information. Thus, according to an embodiment of the invention, at least one such spare code point unused for carrying information relating to the at least one uplink grant is utilized for the downlink control channel signaling, for example for carrying the priority indication information. Hence, these spare code points are, according to this embodiment, used to encode the priorities without adding any additional bits.

Furthermore, for carrier aggregation, some bits do not need to be used in all UL grants. For example, bits used for power control are transmitted in every UL grant but are only obtained from one UL grant. Therefore, according to an embodiment of the invention, at least one such spare power control bit is utilized for the downlink control channel signaling, for example, at least one spare power control bits is used to encode the priority indications.

Also, for carrier aggregation, there may be other CC unique bit combinations signaled in the different UL grants to alleviate the impact of missed UL grants. From these one or more bit combinations, the UE can then determine how many UL grants it was supposed to receive. Thus, according to an embodiment of the invention, the downlink control channel includes at least one bit combination used for indicating a number of uplink grants the UE is to receive. Hence, these bit combinations could jointly be used for encoding the one or more priority indications.

Further, in addition to the already available, and possibly also unused, bits and/or combination of bits in the downlink control channel signaling, at least one additional information bit can be added to the downlink control channel signaling, wherein that at least one additional bit is utilized for carrying priority indication information.

However, for some cases, the UE can itself deduce which UL CC will be preferred transmission of uplink control information. For example, if the UL CC to be selected is an obvious choice, signaling regarding to this selection would be redundant. Therefore, according to an embodiment of the invention, when one specific uplink component carrier of the defined set has been assigned a highest priority, then the priority indication for that specific uplink component carrier is excluded from the signaling to the UE. One such obvious choice is when that specific uplink component carrier is an uplink primary component carrier. Thus, when an uplink primary component carrier has been selected for transmission of the uplink control information in its uplink shared channel, this selection can be deduced by the UE without signaling. The signaling is therefore omitted to minimize overhead in the system.

As a non-limiting example of this embodiment, if a UE is configured for carrier aggregation with one PCC and two SCCs, it could be assumed that the PCC always has the highest priority and that only the priority indications for the remaining CCs, for example, the two SCCs will be signaled.

Further, in some cases, the selection of an uplink component carrier for carrying the uplink control information need to be performed dynamically. Such cases may occur, for instance when the base station has scheduled one uplink shared channel for transmission of aperiodic uplink control information.

According to an embodiment of the invention, in order to handle such situations, a dynamic determination of at least one of the one or more priority indications being assigned to the at least one uplink component carrier of the defined set is performed. By dynamic is here, and in this document, meant that the determination is performed on a subframe time basis, which is shorter than for example the time frame of RRC and MAC signaling. The dynamic determination is performed in accordance with a predetermined rule.

As stated above, according to an embodiment of the invention, if a specific uplink component carrier is an uplink primary component carrier including an uplink shared channel, then, according to a predetermined rule, a highest priority indication/value is dynamically assigned to that specific uplink component carrier.

In some cases, periodic CSI reports may not be sufficient for operating the system with carrier aggregation, since the periodicity of the periodic reports may be too long, or the payload size may be too small. Thus the network node may prefer to also schedule aperiodic CSI reports to retrieve a sufficient amount of channel quality information. Hence, it is expected that, among the multiple UL CCs with PUSCHs, one of them will include uplink control information in the form, e.g., of an aperiodic CSI report.

Thus, correspondingly, according to another embodiment of the invention, if a specific uplink component carrier includes an aperiodic Channel State Information (CSI) report, then, according to another predetermined rule, a highest priority indication/value is dynamically assigned to that specific uplink component carrier. Since the network node scheduler is able to arrange transmission such that only one PUSCH in a given instant is to transmit aperiodic CSI, this specific uplink component carrier can be unique. Here, the content of the PUSCH is used to determine the priority assignment in conjunction with the previously described assignments. Thus, the UL CC with such PUSCH content always has the highest priority among UL CCs with PUSCHs and it will also be used for transmitting the uplink control information. If there is no PUSCH with uplink control information, any of the previously mentioned priority assignment solutions could apply.

As a non-limiting example, if the carrier index ordering is [1 3 2], CC2 would be used for uplink control information transmission if it has a PUSCH with an aperiodic CSI report, even though it has the lowest priority indication. This embodiment simplifies the uplink control information transmission and the CSI reporting, since if the UL CC having a PUSCH with an aperiodic CSI report would not be selected, the aperiodic CSI report has to be dropped, or moved to another UL CC. Since the network node would have adapted the Modulation and Coding Scheme (MCS) in this PUSCH considering that it would include aperiodic CSI information, it is advantageous to use it for transmission of all UCI. Transmission of the aperiodic CSI report in another CC than was initially scheduled by the network node would limit the ability for MCS adaptation and may cause channel coding losses if the UCI is puncturing the user data.

Correspondingly, according to another embodiment of the invention, if a specific uplink component carrier includes an uplink control channel, then, according to another predetermined rule, a highest priority indication/value is assigned to that specific uplink component carrier.

Further, according to an embodiment of the invention, some of these predetermined rule criteria are dynamically checked in sequence, such that if a specific uplink component carrier is an uplink primary component carrier including an uplink shared channel, then a highest priority indication/value is dynamically assigned to that specific uplink component carrier; or if this is not true, then if a specific uplink component carrier includes an aperiodic Channel State Information (CSI) report, then a highest priority indication/value is dynamically assigned to that specific uplink component carrier.

Also, according to another embodiment of the invention, these predetermined rule criteria are dynamically checked in another sequential order, such that if a specific uplink component carrier includes an aperiodic Channel State Information (CSI) report, then a highest priority indication/value is dynamically assigned to that specific uplink component carrier; or if this is not true, then if a specific uplink component carrier is an uplink primary component carrier including an uplink shared channel, then a highest priority indication/value is dynamically assigned to that specific uplink component carrier.

Further, according to an embodiment of the invention, all these predetermined rule criteria are included in the sequence, such that if a specific uplink component carrier is an uplink primary component carrier including an uplink shared channel, then a highest priority indication/value is dynamically assigned to that specific uplink component carrier; or if this is not true, then if a specific uplink component carrier includes an aperiodic Channel State Information (CSI) report, then a highest priority indication/value is dynamically assigned to that specific uplink component carrier; or if this is not true, then if a specific uplink component carrier includes an uplink control channel, then a highest priority indication/value is dynamically assigned to that specific uplink component carrier.

Correspondingly, according to another embodiment of the invention, these predetermined rule criteria are included in another sequential order if a specific uplink component carrier includes an aperiodic Channel State Information (CSI) report, then a highest priority indication/value is dynamically assigned to that specific uplink component carrier; or if this is not true, then if a specific uplink component carrier is an uplink primary component carrier including an uplink shared channel, then a highest priority indication/value is dynamically assigned to that specific uplink component carrier; or if this is not true, then if a specific uplink component carrier includes an uplink control channel, then a highest priority indication/value is dynamically assigned to that specific uplink component carrier.

As stated above, according to an embodiment of the invention, the selection of one uplink component carrier is based on all priorities having been assigned to the at least one uplink component carrier of the set. This is a general rule, which can be added as a last step in each one of the above predetermined rule criteria sequences. Thus, if, assignment of a highest priority indication/value according to any of the rules for primary component carrier, aperiodic CSI, and uplink shared channel does not apply, then the selection of one uplink component carrier is performed according to the general rule, i.e., it is based on all priorities having been assigned to the at least one uplink component carrier of the set.

Further, according to an embodiment of the invention, the priority indications, e.g., a priority order, are determined by the network node. The priority indications can be based on one or more of a number of system parameters. Such system parameters can be, but are not limited to a carrier frequency, a carrier bandwidth, a radio link quality, a short-term interference situation, a modulation and coding scheme, a transport block size, a precoding matrix index, a transmission rank indicator, a long-term interference situation, and a system load. By determining the priority indications on one or more of these parameters, optimized reliability and system load is achieved.

Further, according to an embodiment of the invention, the defined set includes only one single uplink component carrier. The uplink control information is therefore always transmitted on that one single UL CC.

According to an embodiment of the invention, when the set only includes one single uplink component carrier, if the one single uplink component carrier comprises an uplink shared channel, a highest priority is assigned to that single uplink component carrier.

Since the primary component carrier is UE-specific, the primary component carrier is the UL CC that will primarily be used for transmission. Hence, a scheduler will typically first schedule a PUSCH on the primary component carrier before it starts also allocating PUSCH transmissions on one or several secondary component carriers. One situation where there could be transmission on an SCC but not on the PCC, is if there is re-transmission implemented on the SCC but not on the PCC. In such a case, a PUSCH needs to be scheduled on the PCC according to an embodiment of the invention. The base station is in control of the scheduling and could thus assure that there is always a PUSCH in the PCC. Therefore, according to this embodiment of the invention, the one single uplink component carrier is scheduled by the network node for providing an uplink shared channel for transmission of the uplink control information. As a non-limiting example, an aperiodic CSI report could be scheduled in the PCC to facilitate that there will be a PUSCH in the PCC.

Further, as described above for the case with sets including multiple uplink component carriers, predetermined rules can be utilized when assigning priority indications. Such predetermined rules can also be utilized for the case when the set includes only one single uplink component carrier being an uplink primary uplink component carrier. Typically, the single UL CC is the PCC. In that case, UCI is always transmitted on the PUSCH on that PCC. An advantage of this solution is that the priority order is pre-defined and does not need to be signaled.

According to an embodiment of the invention, the priority indication assigned to the one single uplink component carrier is signaled to the UE from the network node.

Further, the different steps of the method of the UCI transmission described above can be combined or performed in any suitable order. A condition for this of course, is that the requirements of a step, to be used in conjunction with another step of the method of the invention, in terms of available measures such as uplink component carriers, priority indications etc., must be fulfilled.

Further, the method for UCI transmission of the invention can be implemented in by a computer program, having code means, which when run in a computer causes the computer to execute the steps of the method. The computer program is preferably included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

According to an aspect of the invention, a network node, such as a base station or an eNodeB, is arranged for receiving uplink control information transmission. The network node comprises set definition means, which is arranged for defining a set including one or more of the uplink component carriers being usable for carrier aggregation for a UE. The network node also comprises priority assignment means, which is arranged for assigning a priority indication to each one of the one or more uplink component carriers of the defined set of uplink component carriers.

The network node further comprises selection means and reception means, wherein if the defined set includes at least one uplink component carrier comprising an uplink shared channel, the selection means is arranged for selecting, one of the at least one uplink component carrier comprising an uplink shared channel. This selected uplink component carrier is to be used for reception of uplink control information in that uplink shared channel. The selection means is arranged for making the selection based on at least one of the one or more priority indications. Thus, one of the at least one uplink shared channel is selected for reception of uplink control information based on at least one of the at least one assigned priority indication. The reception means is arranged for receiving the one selected uplink shared channel, and possibly also one or more other uplink channels.

According to an embodiment of the invention, the network node is provided with signaling means arranged for signaling the at least one priority indication to the UE over the radio interface. Thus, by this signaling means, the network node can perform one or more of the differing signaling operations described above, including for example utilization of downlink control channel signaling, such that the UE is informed about for example the current priority assignments.

The assignment means of the network node is also arranged for performing the assignments procedures described above, including for example assignments according to predetermined rules.

According to an embodiment of the invention, the reception means is arranged for detecting if the UE correctly has selected one uplink shared channel for transmission. Thus, it is indirectly detected if the UE correctly has received the UL grant, and if the UE thereby correctly has executed transmission of the associated PUSCH.

Further, according to an aspect of the invention, a UE is arranged for transmitting uplink control information. The UE comprises selection means, which is arranged for selecting one uplink component carrier from a set including at least one of a number of uplink component carriers being usable for carrier aggregation for that UE. This selection is to be performed if that set includes at least one uplink component carrier comprising an uplink shared channel, and the selected at least one uplink component carrier should comprise an uplink shared channel for transmission of uplink control information. The selection is based on one of more of the at least one priority indication assigned to at least one uplink component carrier of the defined set, respectively. The UE also comprises transmission means, which is arranged for transmitting the uplink control information in the one selected uplink component carrier, for example in the uplink shared channel of that uplink component carrier. Thus, based on the priority indications, one uplink shared channel is selected, and then the uplink control information is transmitted to the network node from the UE on that uplink shared channel.

According to an embodiment of the invention, the UE comprises priority assignment means, which is arranged for assigning the one or more priority indications based on priority indication information signaled from the network node. Thus, the UE is arranged to receive priority indication signaling, being signaled from the network node according to any one of the signaling operations described above.

According to an embodiment of the invention, the UE comprises priority assignment means, which is arranged for assigning the at least one priority indication. The assignment means is arranged for performing these assignments based on any of the predetermined rules described above.

According to an embodiment of the invention, the UE further comprises reception means arranged for receiving UL grants in a downlink control channel.

Both the network node and the UE according to the invention can be adapted, respectively, to perform any of the steps of the method of the invention. A trivial requirement is of course that such a step does involve the network node and the UE, respectively.

Those skilled in the art should understand that the foregoing embodiments or part of the procedures may be implemented through programs instructing related hardware means and the program can be stored on a computer readable storage media.

Figure 1:
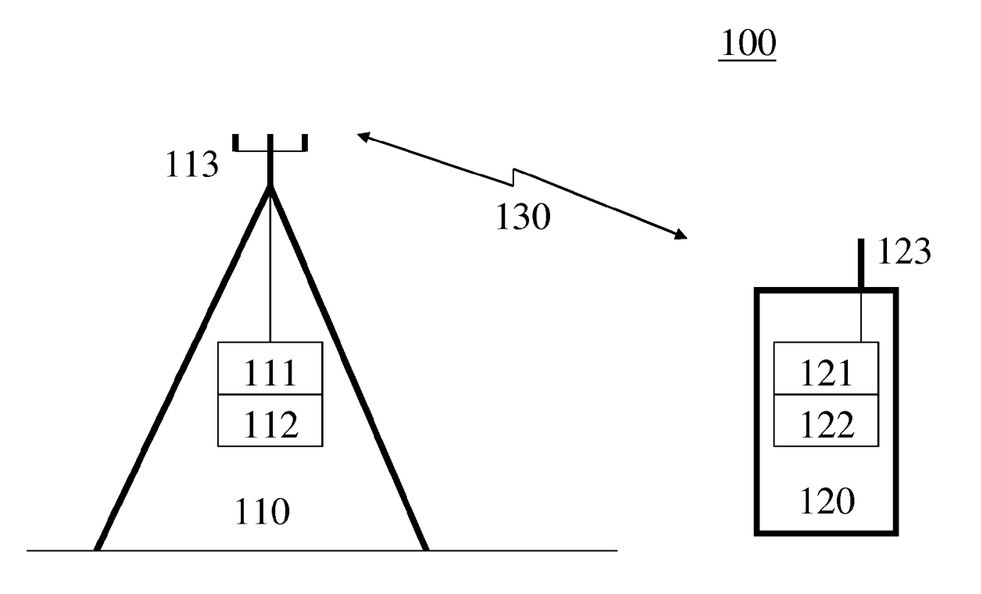

The FIGURE schematically illustrates a radio communication system 100 according to the invention. The radio communication system 100 includes at least one network node 110 and at least one UE 120 communication with each other over a radio interface 130.

In the network node 110, the hardware means 111, being a computer, a processor, a DSP (Digital Signal Processor), an ASIC (Application Specific Integrated Circuit) or the like, is connected to an antenna 113 receiving and transmitting signals over the radio interface 130. The hardware means 111 is, when being, e.g., a processor, a DSP, a computer or the like, connected to a computer readable storage media 112. The computer readable storage media 112 includes ROM/RAM, soft discs, Compact Disk, etc., and is arranged for providing the hardware means 111 with instructions needed for performing the method of the invention, i.e., for performing at least the above described steps of definition of sets, assignment of priority indications, selection of uplink component carriers, signaling, and receiving UCI transmission.

Correspondingly, in the UE 120, the hardware means 121, being a computer, a processor, a DSP (Digital Signal Processor), an ASIC (application Specific Integrated Circuit) or the like, is connected to an antenna 123 receiving and transmitting signals over the radio interface 130. The hardware means 121 is, when being, e.g., a processor, a DSP, a computer or the like, connected to the computer readable storage media 122. The computer readable storage media 322 includes ROM/RAM, soft discs, Compact Disk, etc., and is arranged for providing the hardware means 121 with instructions needed for performing the method of the invention, for example, for performing at least the above described steps of assignment of priority indications, selection of uplink component carriers, and priority assignment signalling.

The method for uplink control information transmission, the network node, and the UE according to the invention may be modified by those skilled in the art, as compared to the exemplary embodiments described above. As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

What is claimed is:

1. A method for uplink control information transmission in a radio communication system utilizing carrier aggregation, wherein a plurality of uplink component carriers can be aggregated for communication between a User Equipment (UE) and a network node in the system, the method comprising:
   determining, by the UE, that a set including one or more uplink component carriers of the plurality of uplink component carriers includes at least one uplink component carrier that comprises an uplink shared channel, and
   selecting, by the UE, one of said at least one uplink component carrier that comprises an uplink shared channel for transmission of uplink control information in the uplink shared channel, wherein the selection is based on priority indication information in which each of said one or more uplink component carriers of said set is assigned a priority indication;
   wherein the priority indication assigned to each of the one or more uplink component carriers of the set, respectively, is based on priority indication of an integer value received from a network node.

2. The method according to claim 1, wherein the set comprises at least two uplink component carriers.

3. The method according to claim 2, wherein the set comprises any one in a group of:
   all uplink component carriers configured for carrier aggregation for the UE;
   all uplink component carriers activated for carrier aggregation for the UE;
   all uplink component carriers on which an uplink shared channel can be transmitted to the UE; and
   all uplink component carriers on which an uplink shared channel is transmitted to the UE.

4. The method according to claim 1, wherein the set comprises an uplink primary component carrier.

5. The method according to claim 1, further comprising receiving, by the UE, said assigned priority indication by utilizing Radio Resource Control (RRC) signaling.

6. The method according to claim 5, wherein the RRC signaling comprises component carrier configuration signaling.

7. The method according to claim 1, wherein one specific uplink component carrier of the set has been assigned a highest priority and the priority indication for the specific uplink component carrier is excluded from being signaled to the UE.

8. The method according to claim 7, wherein the specific uplink component carrier is an uplink primary component carrier.

9. The method according to claim 1, wherein said priority indication information is dynamically determined in accordance with a predetermined rule.

10. The method according to claim 9, wherein the assignment comprises:
if a specific uplink component carrier comprises an aperiodic Channel State Information (CSI) report, a highest priority indication is assigned to the specific uplink component carrier; and
otherwise, if a specific uplink component carrier instead is an uplink primary component carrier including an uplink shared channel, a highest priority indication is assigned to the specific uplink component carrier.

11. The method according to claim 1, wherein the uplink shared channel is a Physical Uplink Shared Channel (PUSCH) in a Long Term Evolution Advanced (LTE-Advanced) system.

12. The method according to claim 1, wherein the uplink control information is an Uplink Control Information (UCI) in a Long Term Evolution Advanced (LTE Advanced) system, the UCI including any one of, or any combination of:
at least one Acknowledgement (Ack);
at least one Negative Acknowledgement (Nack);
at least one periodic Channel Quality Information (CQI) report;
at least one periodic Channel Rank Indicator (RI) report;
at least one periodic Precoding Matrix indicator (PMI) report;
at least one aperiodic Channel Quality Information (CQI) report;
at least one aperiodic channel Rank Indicator (RI) report;
at least one aperiodic Precoding Matrix Indicator (PMI) report; and
at least one Scheduling Request (SR).

13. The method according to claim 1, wherein the priority indication received from the network node is a component carrier index identifying a component carrier and representing a priority ranking of the identified component carrier.

14. A user equipment (UE) arranged for transmitting uplink control information in a radio communication system utilizing carrier aggregation, wherein a number of uplink component carriers can be aggregated for communication between the UE and a network node in the system, the UE comprising:
a processor configured to select from a set including at least one of the number of uplink component carriers, if the set comprises at least one uplink component carrier comprising an uplink shared channel, one of the at least one uplink component carrier comprising an uplink shared channel for transmission of uplink control information in the uplink shared channel, wherein the selection is based on a priority indication information in which each of said at least one uplink component carrier of said set is assigned a priority indication; and
a transmitter configured to transmit the uplink control information in the uplink shared channel of the selected one uplink component carrier;
wherein the priority indication assigned to each of the one or more uplink component carriers of the set, respectively, is based on priority indication of an integer value received from a network node.

15. The UE according to claim 14, wherein the set comprises at least two uplink component carriers.

16. The UE according to claim 15, wherein the set comprises wherein the set comprises any one in a group of:
all uplink component carriers configured for carrier aggregation for the UE;
all uplink component carriers activated for carrier aggregation for the UE;
all uplink component carriers on which an uplink shared channel can be transmitted to the UE; and
all uplink component carriers on which an uplink shared channel is transmitted to the UE.

17. The UE according to claim 14, wherein the set comprises an uplink primary component carrier.

18. The UE according to claim 14, wherein one specific uplink component carrier of the set has been assigned a highest priority, and the priority indication for the specific uplink component carrier is excluded from being signaled to the UE.

19. The UE according to claim 14, wherein said priority indication information is dynamically determined in accordance with a predetermined rule.

20. The UE according to claim 14, wherein the uplink shared channel is a Physical Uplink Shared Channel (PUSCH) in a Long Term Evolution Advanced (LTE-Advanced) system.

21. The UE according to claim 14, wherein the uplink control information is an Uplink Control Information (UCI) in a Long Term Evolution Advanced (LTE Advanced) system, the UCI including any one of, or any combination of:
at least one Acknowledgement (Ack);
at least one Negative Acknowledgement (Nack);
at least one periodic Channel Quality Information (CQI) report;
at least one periodic Channel Rank Indicator (RI) report;
at least one periodic Precoding Matrix indicator (PMI) report;
at least one aperiodic Channel Quality Information (CQI) report;
at least one aperiodic channel Rank Indicator (RI) report;
at least one aperiodic Precoding Matrix Indicator (PMI) report; and
at least one Scheduling Request (SR).

22. The UE according to claim 14, wherein the priority indication received from the network node is a component carrier index identifying a component carrier and representing a priority ranking of the identified component carrier.

23. An apparatus for uplink control information transmission in a radio communication system utilizing carrier aggregation, wherein a number of uplink component carriers can be aggregated for communication between a User Equipment (UE) and a network node in the system, the apparatus comprising at least one processor configured to:
define a set including at least one of the number of uplink component carriers;
assign a priority indication to each of the at least one uplink component carrier of the set; and
if the set comprises at least one uplink component carrier comprising an uplink shared channel, select one of the at least one uplink component carrier comprising an uplink shared channel for transmission of uplink control information in the uplink shared channel, wherein the selection is based on a priority indication information in which each of said at least one uplink component carrier of said set is assigned a priority indication;
wherein the priority indication assigned to each of the one or more uplink component carriers of the set, respectively, is based on priority indication of an integer value received from a network node.

24. The apparatus according to claim 23, wherein the set comprises at least two uplink component carriers.

25. The apparatus according to claim 24, wherein the set comprises any one in a group of:
- all uplink component carriers configured for carrier aggregation for the UE;
- all uplink component carriers activated for carrier aggregation for the UE;
- all uplink component carriers on which an uplink shared channel can be transmitted to the UE; and
- all uplink component carriers on which an uplink shared channel is transmitted to the UE.

26. The apparatus according to claim 23, wherein the set comprises an uplink primary component carrier.

27. The apparatus according to claim 23, wherein the priority indication received from the network node is a component carrier index identifying a component carrier and representing a priority ranking of the identified component carrier.

28. A network node arranged for receiving uplink control information transmission in a radio communication system utilizing carrier aggregation, wherein a number of uplink component carriers can be aggregated for communication between a User Equipment (UE) and the network node in the system, the network node comprising:
- a processor configured to:
  - define a set including at least one of the number of uplink component carriers;
  - define a priority indication information in which each uplink component carrier of the set is assigned a priority indication;
  - select, if the set comprises at least one uplink component carrier comprising an uplink shared channel, one of the at least one uplink component carrier comprising an uplink shared channel for reception of said uplink control information in the uplink shared channel, wherein the selection is based on said priority indication information; and
- a receiver, configured to receive said uplink control information in the uplink shared channel of the selected uplink component carrier;
wherein the priority indication assigned to each of the one or more uplink component carriers of the set, respectively, is based on priority indication of an integer value received from a network node.

29. The network node as claimed in claim 28, wherein the network node signals the at least one priority indication to the UE by utilizing Radio Resource Control (RRC) signaling.

30. The network node as claimed in claim 29, wherein the RRC signaling comprises component carrier configuration signaling.

31. The network node according to claim 28, wherein the priority indication received from the network node is a component carrier index identifying a component carrier and representing a priority ranking of the identified component carrier.

* * * * *